United States Patent Office 3,537,962
Patented Nov. 3, 1970

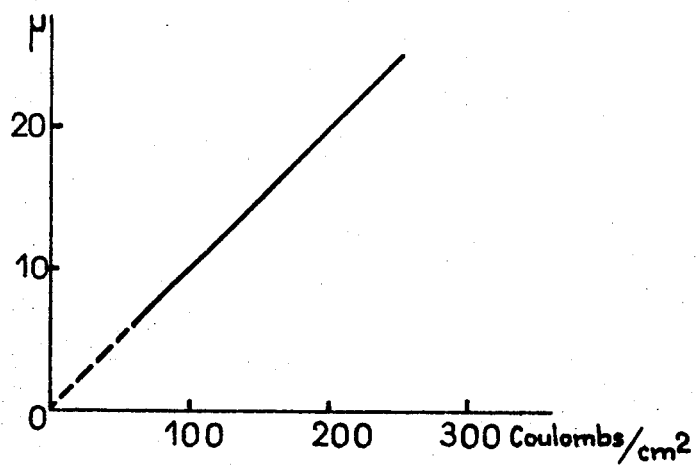

3,537,962
METHOD OF SELECTIVELY ETCHING SILICON
Jean Francois Kover, Paris, France, assignor to Compagnie Generale d'Electricite, Paris, France, a corporation of France
Continuation-in-part of application Ser. No. 548,312, May 6, 1966. This application Sept. 3, 1968, Ser. No. 756,848
Int. Cl. C23b 3/02
U.S. Cl. 204—141                8 Claims

ABSTRACT OF THE DISCLOSURE

The present disclosure is directed to a method of selectively etching silicon which comprises electrochemically dissolving silicon in an electrolyte comprising an organic solvent solution of a compound such as a halogen other than fluorine, or a halide other than fluorides, including mixtures of said halogens and halides, said silicon acting as the anode therein.

BACKGROUND OF THE INVENTION

This is a continuation-in-part of application Ser. No. 548,312, filed May 6, 1966, and now abandoned.

The present invention relates to a method of selective etching on silicon and, in particular, to a method therefor wherein the oxygenated components of the silicon, such as silica, remain unaffected.

The methods used in the art at present to dissolve silicon involve three types:

(a) Dissolving by the action of a halogen, and more particularly chlorine. The product of the reaction, usually a combination of one atom of silicon with four atoms of halogen, is eliminated because of its volatility. The advantage of such a method is that the silica is not etched, hence "masking" is possible for the manufacture of a specific device. On the other hand, the reaction can only take place at high temperatures of the order of 600° to 800° C.

(b) Dissolving by the action of hydrofluoric acid, or of various reagents containing this acid or its salts. Here the reaction takes place at low temperatures and masking can be effected by the use of various organic resins. Nevertheless, the silica is etched, especially when it is obtained by anodic oxidation. Another drawback is that some fluorine remains adsorbed on the surface of the silicon and is very difficult to remove.

(c) Dissolving by the reaction of silicon with various organic substances, commonly known as chelating agents, in solution in a mixture of water and alcohol or of an organic amine. Here the reaction takes place at about room temperature, but it is nevertheless rather slow. In this case the silica is gradually etched, and when this latter is obtained by anodic oxidation it is etched more rapidly.

Aside from the above-noted disadvantages attendant to the processes of the prior art, masking with an organic resin is difficult because of the poor resistance of such resins to the solution used for the reaction.

SUMMARY OF THE INVENTION

The object of the present invention is to obviate the above-mentioned drawbacks and disadvantages of the prior art processes and to provide an advantageous process for etching on silicon.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention it has been found that the above-mentioned disadvantages may be eliminated and a much improved method of selectively etching silicon can be obtained by electrochemically dissolving silicon in an electrolyte comprising an organic solvent solution of a compound such as a halogen other than fluorine or a halide other than fluorides, including mixtures of said halogens and halides, said silicon acting as the anode therein. The organic solvent solution contains a liquid organic solvent such as an alcohol, including glycols, or an amide. More specifically, the liquid organic solvent may be, for example, methanol, ethanol, N-methylacetamide, and the like. The halogens include chlorine, bromine and iodine and the halides include chlorides, bromides and iodides, such as for example, silicon chloride, titanium chloride and the like. The present method is also effective when utilizing mixtures of said halogens and halides, such as for example a mixture of bromine and titanium chloride or bromine and silicon chloride.

Fluorine and fluorides are eliminated from the present method because if used, the surface of the silicon could not be freed from adsorbed fluorine.

According to an especially advantageous embodiment of the present invention, the electrolyte is composed of a solution containing 70 to 90%, preferably 80%, methanol, 5% to 15%, preferably 10%, bromine and 5% to 15%, preferably 10% of TiCl$_4$, all of the percentages being by weight.

By way of examples, which are not to be considered as limiting, the electrolyte used in the present method can have the following compositions:

(1) 90% methanol, ethanol, or a glycol and 10% bromine.

(2) 85% methanol, ethanol, or a glycol and 15% titanium chloride.

(3) Frequently, however, an electrolyte is employed which comprises a mixture of a halogen and a halide, such as for example an electrolyte comprising 80% methanol, 10% bromine and 10% titanium chloride.

The cathode employed therewith is composed of any appropriate metal unaffected by the electrolyte, for example, platinum, rhodium or iridium.

The anode reaction mechanism involves the reduction of the soluble halide to a lower degree of oxidation with the release of nascent halogen which reacts with the silicon to produce a soluble silicon halide, the organic liquid acting as an electrolyte and as a solvent, and the halogen acting in a complex manner on the regularity and progress of the dissolution. The dissolving of the silicon occurs with a good electrical yield and obviously is a function of the current and of the duration of electrolysis.

As is customary for anodic oxidations, the intensity of the current and the yield of the dissolving reaction depend upon the silicon type, N or P, and the resistivity thereof. Preferably, said current, and hence the amount of dissolution of the silicon, may be increased in all cases by illuminating the surface of the silicon during the dissolving process.

The graph of the drawing shows, by way of illustration, a silicon dissolution curve. This curve shows the thickness of silicon dissolved as a function of the quantity of electricity used. The thickness, in microns, of silicon dissolved is plotted on the vertical axis, whereas the quantity of electricity used, in coulombs/cm.$^2$ is plotted on the horizontal axis. Such a curve is generally found experimentally to be approximately linear.

By way of example, a dissolution of 11.7 microns of silicon (type N, 4 ohms—cm.) is obtained in four hours using an electrolyte containing, by weight, 10% bromine, 10% TiCl₄ and 80% methanol, using a voltage of 3 volts and illumination, the current being 10.9 ma./cm.²

The method according to the present invention does not result in any etching of silica, even if the latter is an anodic oxide, and silica itself can thus be used for masking purposes. Moreover, the surface of the silicon laid bare should be completely devoid of adsorbed fluorine. The method, however, cannot entirely eliminate a layer of silicon deposited on a supporting subtance, of silica, for example, since if a grain of silicon is separated at the time of the etching process, it cannot be dissolved since the current can no longer flow through. This phenomenon can, of course, only occur at the end of the dissolving process and only with very fine layers, and moreover, does not constitute a serious drawback since the remaining grain of silicon, being electrically insulated, does not interfere with the electrical conductivity of the obtained device.

Furthermore, owing to the different dissolving speeds according to the type and resistivity of the silicon employed it is possible to carry out selective dissolving processes upon various parts of a device comprising diverse types of silicon resistivities. This property enables a dissolution to be carried out locally on a semiconductor supporting substance. Thus, the dissolution locates on a portion of the surface a zone whose resistivity is optimal for obtaining a given part of an integrated circuit.

It is also possible to gradually replace the electrolyte of the invention, which ensures dissolution, by an electrolyte which makes anodic oxidation possible. This makes it possible to pass without atmospheric or other contamination from the step of baring a part of a semiconductor device to the passivation stage by the formation of anodic silicon oxide.

The process of the present invention is advantageously used for baring certain parts such as junctions, for example, of a semiconductor element.

The invention being thus described, it will be obvious that the same may be varied in many ways. Such variations are not to be regarded as a departure from the spirit and scope of the invention and all such modifications are intended to be included within the scope of the following claims.

It is claimed:

1. A method of selectively etching silicon which comprises electrochemically dissolving silicon in an electrolyte consisting essentially of an organic solvent selected from the group consisting of strongly polar alkanols, glycols and amides containing at least one member selected from the group consisting of chlorine, bromine, iodine, titanium halides other than fluorides, and silicon halides other than fluorides, said silicon acting as the anode therein.

2. The method of claim 1, wherein said organic solvent is selected from the group consisting of methanol, ethanol and N-methylacetamide and said compound is selected from the group consisting of titanium chloride and silicon chloride.

3. The method of claim 1, wherein said electrolyte comprises, by weight, 70 to 90% of methanol, 5 to 15% of bromine and 5 to 15% of titanium tetrachloride.

4. The method of claim 1, wherein said electrolyte comprises, by weight, 90% of methanol or ethanol and 10% bromine.

5. The method of claim 1, wherein said electrolyte comprises, by weight, 85% of methanol or ethanol and 15% titanium chloride.

6. The method of claim 1, wherein said electrolyte comprises, by weight, 80% methanol, 10% bromine and 10% titanium chloride.

7. The method of claim 1, wherein said electrolyte comprises an organic solvent and a mixture of bromine with titanium chloride or bromine with silicon chloride.

8. The method of claim 1, wherein the surface of said silicon is illuminated during at least a part of said dissolving process.

References Cited
FOREIGN PATENTS 602,880   8/1960   Canada.

ROBERT K. MIHALEK, Primary Examiner

U.S. Cl. X.R.

204—143

UNITED STATES PATENT OFFICE
CERTIFICATE OF CORRECTION

Patent No. 3,537,962    Dated November 3, 1970

Inventor(s) Jean Francois Kover

It is certified that error appears in the above-identified patent and that said Letters Patent are hereby corrected as shown below:

In the heading to the printed specification, under line 8, insert -- Claims priority, application France May 7, 1965 PV 16295 --.

Signed and sealed this 29th day of June 1971.

(SEAL)
Attest:

EDWARD M. FLETCHER, JR.        WILLIAM E. SCHUYLER, JR.
Attesting Officer              Commissioner of Patents